United States Patent
Stroh

(10) Patent No.: US 9,765,710 B2
(45) Date of Patent: *Sep. 19, 2017

(54) CONTROL SYSTEM FOR A MODEL-BASED KNOCK SUPPRESSION SYSTEM USING A MULTIPLE ACTUATION STRATEGY

(71) Applicant: Cummins Inc., Columbus, IN (US)

(72) Inventor: David Stroh, Columbus, IN (US)

(73) Assignee: Cummins Inc., Columbus, IN (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/638,159

(22) Filed: Mar. 4, 2015

(65) Prior Publication Data
US 2015/0176510 A1 Jun. 25, 2015

Related U.S. Application Data

(63) Continuation of application No. 13/454,861, filed on Apr. 24, 2012, now Pat. No. 8,977,475.

(51) Int. Cl.
*F02D 35/02* (2006.01)
*F02P 5/152* (2006.01)
(Continued)

(52) U.S. Cl.
CPC .......... *F02D 35/025* (2013.01); *F02D 35/02* (2013.01); *F02D 35/026* (2013.01);
(Continued)

(58) Field of Classification Search
CPC .... F02D 35/025; F02D 35/026; F02D 35/027; F02P 5/152

USPC ............. 701/111, 114, 110, 108, 102; 123/406.21, 406.24, 406.29, 406.35, 123/406.38, 406.39, 406.47, 406.48
See application file for complete search history.

(56) References Cited

U.S. PATENT DOCUMENTS 4,433,654 A 2/1984 Yokooku
4,542,727 A 9/1985 Britsch et al.
(Continued)

FOREIGN PATENT DOCUMENTS

CN 102345532 2/2012
EP 2 392 802 A1 12/2011
JP 2011085081 A * 4/2011

OTHER PUBLICATIONS

JP 2011085081 (Ryota Yukinaga) Apr. 28, 2011 (Machine Translation). [online] [retrieved on Aug. 27, 2016]. Retrieved from JPO Website.*
(Continued)

*Primary Examiner* — Mahmoud Gimie
(74) *Attorney, Agent, or Firm* — Foley & Lardner LLP

(57) ABSTRACT

The present invention provides for predicting peak cylinder temperatures above which knock in an engine may become more frequent and then provides one or more actuation approaches to reduce the knock of the engine while maintaining engine performance. The actuation approaches of the present invention include one or more of direct injection, engine gas recirculation, and spark retarding, where the application of one or more the actuation approaches is determined based upon using operational and engine characteristic inputs as well as modeling and estimation values as inputs in a feedforward control methodology.

20 Claims, 5 Drawing Sheets

(51) Int. Cl.
   *F02D 41/00*   (2006.01)
   *F02D 35/00*   (2006.01)
   *F02D 41/14*   (2006.01)

(52) U.S. Cl.
   CPC ....... *F02D 35/027* (2013.01); *F02D 41/0052* (2013.01); *F02P 5/152* (2013.01); *F02D 2041/141* (2013.01); *Y02T 10/46* (2013.01); *Y02T 10/47* (2013.01)

(56) References Cited

U.S. PATENT DOCUMENTS

| | | |
|---|---|---|
| 4,711,212 A | 12/1987 | Haraguchi et al. |
| 5,231,830 A | 8/1993 | Entenmann et al. |
| 6,000,384 A * | 12/1999 | Brown ................ F02D 19/0631 123/436 |
| 6,267,100 B1 | 7/2001 | Torno et al. |
| 7,261,098 B2 | 8/2007 | Vigild et al. |
| 7,287,377 B2 | 10/2007 | Wild et al. |
| 7,673,615 B2 | 3/2010 | Oe et al. |
| 7,690,352 B2 | 4/2010 | Zhu et al. |
| 7,784,272 B2 | 8/2010 | Song et al. |
| 7,845,339 B2 | 12/2010 | Cecil et al. |
| 2003/0213475 A1 | 11/2003 | Robertson et al. |
| 2007/0215101 A1 | 9/2007 | Russell et al. |
| 2008/0190185 A1 | 8/2008 | Zimmer |

OTHER PUBLICATIONS

Office Action Issued for Chinese Patent Application No. 201380017244.4, issued Dec. 24, 2015, 8 pages.

International Search Report and Written Opinion for International Application No. PCT/US2013/037603, dated Jul. 30, 2013, 7 pages.

* cited by examiner

CONTROL SYSTEM FOR A MODEL-BASED KNOCK SUPPRESSION SYSTEM USING A MULTIPLE ACTUATION STRATEGY

CROSS-REFERENCE TO RELATED APPLICATIONS

The present Application claims the benefit of priority as a continuation of U.S. patent application Ser. No. 13/454,861, filed Apr. 24, 2012, which is incorporated herein by reference in its entirety.

FIELD OF INVENTION

This invention relates generally to control systems and more particularly to a feedforward control system with feedback for reducing knock in an engine.

BACKGROUND OF THE INVENTION

Reducing knock in an engine combustion engine, has been a major challenge over the past decade and will continue to be a challenge in the future in part due to the continuing stringent emission requirements for engine emissions and control systems related thereto. Attempts to reduce knock often include an approach that embraces one in a series of methods such as Direct injection (DI), engine gas recirculation [EGR] dilution, or spark retarding (Spark Retard or "SR"). Knock is widely understood to be an issue that arises with respect to increased or peak cylinder temperatures in an engine above which knocking may become more prevalent.

However, reducing knock tendency in spark-ignited (SI) engines, in particular, can limit the torque output of the engine as the charge/air mixture is often restricted. While each approach may have some benefit for specific situations and certain unique operating environments, each often has many disadvantages when considered across the operating environment of most engines.

For instance, while DI may allow more accurate control over fuel metering (the amount of fuel injected) and injection timing (exactly when the fuel is introduced into the cylinder), engines able to take better benefit of such a limited approach only because they are rugged in design, utilize high pressure systems and are therefore often very expensive and complex. Similarly, the DI event injects secondary level of fuel close to the injection timing event in an attempt to suppress the knock, and the timing of such an event may not be ideal in certain operational ranges.

Similarly, for EGR, while adding EGR to the air flow rate of an engine is more beneficial than displacing some of the inlet air and also allows exhaust NOx emissions to be reduced substantially, EGR takes time and also effectively reduces the combustion rate thereby making stable combustion often a challenge. Another variation often deployed in SI engines to reduce the knock is to retard the spark; however disadvantages in this sole approach include increased hydrocarbon output and heightened NOx emissions. Further, during a spark retarding (SR) event efficiency of the engine can be sacrificed greatly and in some cases, certain operational regions of combustion may fail. Each of these methods has a similar objective of reducing peak in-cylinder temperatures.

As each of these approaches, or methods of actuation, has disadvantages to the performance of the engine, with respect to transient times, and in achieving the objective of reducing knock across an operating environment of an engine, accordingly, an approach that is able to accommodate knock reduction across an engine's operating environment using a plurality of actuation approaches at opportune times with respect to the operational state and performance characteristics of the engine, is needed. The present invention is directed towards meeting these and many other needs.

SUMMARY OF THE INVENTION

The present invention fulfills these needs and has been developed in response to the present state of the art, and in particular, in response to the problems and needs in the art that have not yet been fully solved by currently available technologies. The present invention provides a control method for determining one or more actuation approaches for reducing knocking events for an engine while maintaining improved engine performance over known approaches.

In one embodiment, the present invention provides for a method for reducing in-cylinder temperature in a spark-ignited engine using a plurality of actuation events in relation to estimated peak cylinder temperature and sensed knock. The embodiment comprises determining a plurality of input conditions of the engine including in-cylinder air, fuel and EGR fractions; determining a plurality of modeling values associated with additional inputs in relation to the operation of the engine in a preferred state including a knock threshold temperature and a peak end gas temperature estimate; determining a first actuation event by comparing a desired EGR fraction value with predetermined fraction system limits; executing the first actuation in response to a first command; determining a second actuation event by comparing one or more peak end gas temperature estimates with predetermined end gas temperature system limits; executing the second actuation in response to a second command; determining a final actuation event after receiving feedback of a sensed knock value from a sensor determining sensed knock; and, executing the final actuation in response to a final command.

In another embodiment the present invention provides for a system comprising: a control system for a spark-ignited engine having an exhaust gas output producing exhaust gas including a fuel injection system and an engine gas recirculation (EGR) arrangement and at least one sensor operatively coupled to detect knock from the engine; the control system comprising one or more actuation controllers in communication with the at least one sensor and one or more one or more of a spark-ignition, a fuel injector, and an exhaust gas recirculation system of the engine; the control system utilizing a feedforward control to approximate a reduction in knock after initiating one or more actuation events to one or more of the spark-ignition, fuel injector, and exhaust gas recirculation system through commands through the one or more actuation controllers; and a feedback control, wherein the control system transforms data from the at least one sensor into an output signal that instructs the one or more actuation controllers to perform the one or more actuation events.

In a further embodiment, the present invention provides for a computer program product stored on a computer usable medium, comprising: computer readable program means for causing a computer to control an execution of an application within a memory control device in operable communications with a spark-ignited engine having an exhaust gas output producing exhaust gas including a fuel injection system, an engine gas recirculation (EGR) arrangement, at least one sensor operatively coupled to detect knock from the engine, and a controller; the computer program means determining a plurality of input conditions of the engine including in-cylinder air, fuel and EGR fractions; determining a plurality of modeling values associated with additional inputs in relation to the operation of the engine in a preferred state including a knock threshold temperature and a peak end gas temperature estimate; determining a first actuation event by comparing a desired EGR fraction value with predetermined fraction system limits; executing the first actuation in response to a first command; determining a second actuation event by comparing one or more peak end gas temperature estimates with predetermined end gas temperature system limits; executing the second actuation in response to a second command; determining a final actuation event after receiving feedback of a sensed knock value from a sensor determining sensed knock; and, executing the final actuation in response to a final command; wherein the sensed data is transformed into an output signal that instructs the controller to perform one or more actuation events.

In a further preferred embodiment, the present invention is a spark-ignited internal combustion engine having a controller in communication with a spark igniter, a plurality of fuel injectors, an EGR gate for an EGR configuration, engine control sensors and a knock sensor, wherein the controller further comprises a computer program in the controller for reducing knock in the engine during operation, the computer program further comprising: computer readable program means for determining a plurality of input conditions of the engine from the engine control sensors including in-cylinder air, fuel and EGR fractions and engine speed; determining a plurality of modeling values associated with additional inputs in relation to the input conditions of the engine in a preferred state including a knock threshold temperature and a peak end gas temperature estimate; determining a first actuation event by comparing a desired EGR fraction value with predetermined fraction system limits; executing the first actuation in response to a first command; determining a second actuation event by comparing one or more peak end gas temperature estimates with predetermined end gas temperature system limits; executing the second actuation in response to a second command; determining a final actuation event after receiving feedback of a sensed knock value data from a knock sensor; and, executing the final actuation in response to a final command; wherein the sensed data is transformed into an output signal from the controller to the engine to perform one or more actuation events.

Further embodiments, forms, objects, features, advantages, aspects, and benefits of the present application shall become apparent from the detailed description and drawings included herein.

BRIEF DESCRIPTION OF THE DRAWING(S)

DETAILED DESCRIPTION OF THE ILLUSTRATIVE EMBODIMENTS

Figure 1:
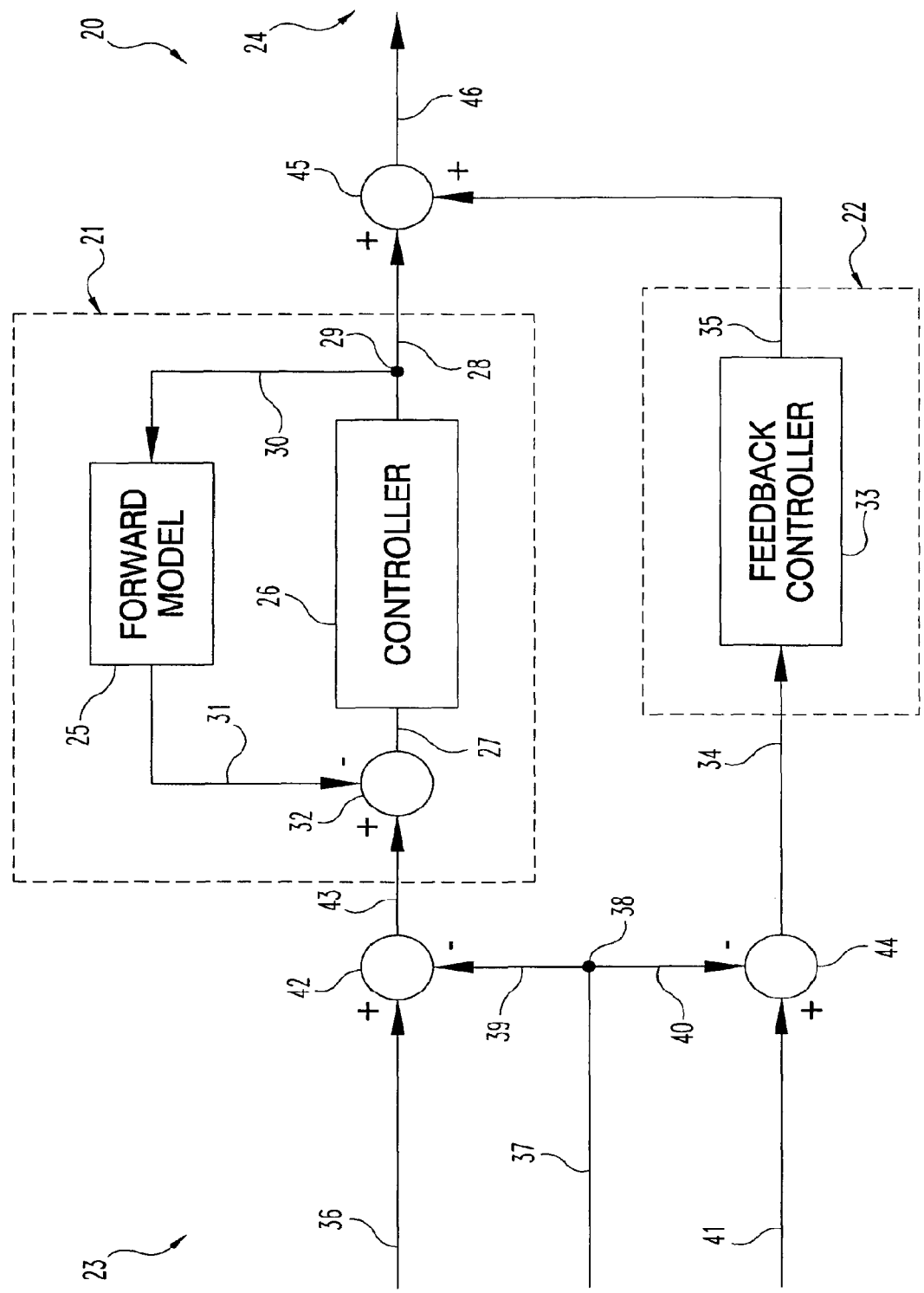
FIG. 1 depicts a general overview of a control system having a feedforward control in accordance with an embodiment of the present invention.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations, modifications, and further applications of the principles of the present invention as illustrated herein being contemplated as would normally occur to one skilled in the art to which the invention relates.

The present invention provides for a method, control system, computer program product and engine providing a control method for determining one or more actuation approaches for reducing knocking events for an engine while maintaining improved engine performance over known approaches. The actuation approaches of the present invention include one or more of DI, EGR and SR where the application of one or more the actuation approaches is determined based upon using operational and engine characteristic inputs as well as modeling and estimation values as inputs in a feedforward control methodology. In general the present invention provides for predicting a peak cylinder temperature which when the operating in-cylinder temperature of the engine rises above, the likelihood of knock increases. Preferably, a feedforward control methodology incorporates the use of a feedforward control having a forward model and controller and a feedback controller in various forms for varied embodiments of the present invention.

It will be appreciated by those skilled in the art that the actuator approaches of the present invention have benefits and detriments in operation for certain operating ranges during the combustion cycle. For instance, spark retarding events (SR) can be timed to be near instantaneous, are recognized to impact engine performance and has limited impact to emission efficiencies. An EGR actuation however is slower than an SR event, as essentially exhaust air is recirculated, is generally of limited impact to engine performance, and has limited effect on emission efficiencies in certain operating conditions; further EGR activity is contingent upon air cooling. A dual-pulse direct injected (DI) actuator approach however, while slower than an SR is quicker than EGR, may improve engine performance and may improve emission efficiencies as well. As a result, the present invention contemplates the benefits and drawbacks of each of the actuator approaches individually and in combination in view of the operation, modeled estimates and desired efficiencies of operation of the engine.

The present invention provides a control method in determining the application of one or more actuation approaches for an engine to reduce knocking events during operation. The present invention in one or more embodiment contemplates the use of multiple actuator approaches alone or in combination, serially or concurrent, singularly or in parallel, and at times predetermined as well as those of actual or forecasted events.

In preferred embodiment the present invention provides additional feedback control to the combination of SR, EGR and DI steps where additional measurements, feedback, inputs and operations may be undertaken such that one or more actuation activities is undertaken, modified, ceased, concurrently activated, assessed or otherwise initiated to the benefit of an engine's operation in the reduction of knock. Similarly, instead of determining temperature estimates, the present invention may also use knock margin determinations in and as substitute therefore. For instance, in one embodiment, feedback control with regard to sensed knock is utilized to reduce knock in a final actuation operation, or series thereof, using a spark retarding event approach.

Referring now to the drawings, an aspect of various embodiments of the present invention is described in FIG. 1.

This use of feedforward control is a preferred implementation for the present invention. It will be appreciated by those of ordinary skill in the art of the applicability to a feedforward approach in FIGS. 2-5 as well. Therefore, the present invention incorporates herein by reference the teachings and utilization offered by U.S. Pat. No. 7,784,272, entitled "Control Systems for an Engine Aftertreatment System." Further aspects of various embodiments of the present invention are described in FIG. 1.

Embodiments of the present invention include the use of feedforward control and feedback control, in various forms and implementations. From FIG. 1, in one aspect of the present invention, control system 20 includes feedforward control 21 and feedback control 22. Inputs 23 enter control system 20 and are transformed into an output 24. In one or more embodiments, the inputs may relate to present operating conditions of the engine, exhaust gas, catalyst or injection systems. These examples of types of inputs may be depicted in FIG. 1, based upon the particular implementation, at 36, 37 and 41, by example.

In one or more preferred embodiments, the inputs may be engine in-cylinder air and fuel, cylinder EGR fractions, engine temperatures, engine load, engine speed, and various modeled or estimated characteristics. Similarly, the output may be a signal to the one or more injection systems, mechanical devices such as a pump supplying a NOx reduction agent and the like. In one or more preferred embodiments, the output may further include signals to control EGR fractions, combustion activities, temperatures, direct injection pulse quantities and angles, spark retard signaling, and similar, in one or more combinations.

In one embodiment, for example, three input signals provide data to be processed by the control system 20, or as may also be used herein the model, modeling estimator, or similar. In this embodiment, input signal 37 provides data concerning the threshold temperature for knock, or T_Knock, for example. T_Knock may be a predetermined value, have been calculated from a separate feedforward control, or be the result of a modeling estimation in one or more preferred embodiments. Also in this embodiment, input signal 36 provides a value indicative of the engine speed and engine load. Input signal 41 may represent the measured knock at present determined from associated sensor data of a knock sensor that detects the audible frequency of knock. Additionally there may also be further data inputs not shown such as EGR Temperature impact values determined from a model.

In a preferred embodiment, input signal 37 splits at connection point 38 into first branch signal 39 and second branch signal 40 though such is not required by the present invention. First branch signal 39 is combined with input signal 36 at junction 42. Additional data such as that of the EGR Temperature impact value may also be combined at 42. This combination of first branch signal 39 and input signal 36 provides the data necessary to produce a signal 43 that references the amount of operating condition and T_knock threshold such that as input to the forward model, a desired EGR fraction determination can be made at 28.

Second branch signal 40 in a preferred embodiment may be combined with input signal 41 at junction 44, though such is exemplary here. The third signal of this embodiment, input signal 41, provides the measured knock and the combination of such with the second branch signal 40 provides data necessary to form control signal 34 representing the knock threshold temperature and the measured knock.

Typically, for the present invention, the feedforward control 21 includes a forward model 25 and a controlling means such as a controller 26. In the example of FIG. 1, forward model 25 is preferably a mathematical model or algorithmic approach that approximates the time or the amount of an action associated with the reduction of knock for an engine.

For instance, in one preferred embodiment, the mathematical model approximates a peak end gas temperature, based upon inputs from engine characteristics such as in-cylinder air and fuel mix, engine speed and EGR fraction estimates. The estimated peak end gas temperature can then be compared with a knock temperature possibly determined by a separate mathematical model or through its own feedforward control method.

In another preferred embodiment, the feedforward control includes a forward model of estimating a knock temperature threshold model with a controller. The forward model determines a threshold limit for a knock temperature in which the engine operation should be sought to be less than, using one or more actuation approaches, to reduce temperature and effect knock reduction. The inputs to the forward model of such a preferred embodiment include engine load and engine speed. From these inputs, using the mathematical model or algorithmic model of the forward model, a threshold limit for a knock temperature can be determined. Similarly, using a feedback control approach in combination with the feedforward model, the threshold limit can be actively adjusted based upon operation of the engine.

Referring again to FIG. 1, feedback control 22 includes a feedback controller 33. Feedback controller 33 is a mathematical model to transform control signal 34 to produce a feedback output signal 35. Control signal 34 is preferably formed by the combination of two or more of the various inputs 23 to control system 20. Typically, it will be appreciated by those skilled in the art that the control signal 34 may also be obtained using various other models and inputs in combination as well. Similarly, signals within the feedforward control may operate in a manner conducive to the implementation of the present invention. For example, signal 27 may enter controller 26 and be transformed by controller 26 to produce signal 28. Signal 28 splits at point 29 and branch signal 30 enters forward model 25. Forward model 25 transforms branch signal 30 into signal 31. Signal 31 is combined with signal 43 at junction 32 to reproduce a new signal 27. Similarly, control signal 34 is transformed by feedback controller 33 to produce feedback signal 35. Feedback signal 35 is combined with signal 28 at junction 45 to produce output signal 46. In this embodiment, output signal 46 controls the command associated with the EGR fraction.

The signal pathway of FIG. 1 is representative of an example of the operation of a feedforward control for the present invention but, for the avoidance of doubt, is not the only manner or method of such pathway as explicitly diagrammed in FIG. 1.

Figure 2:
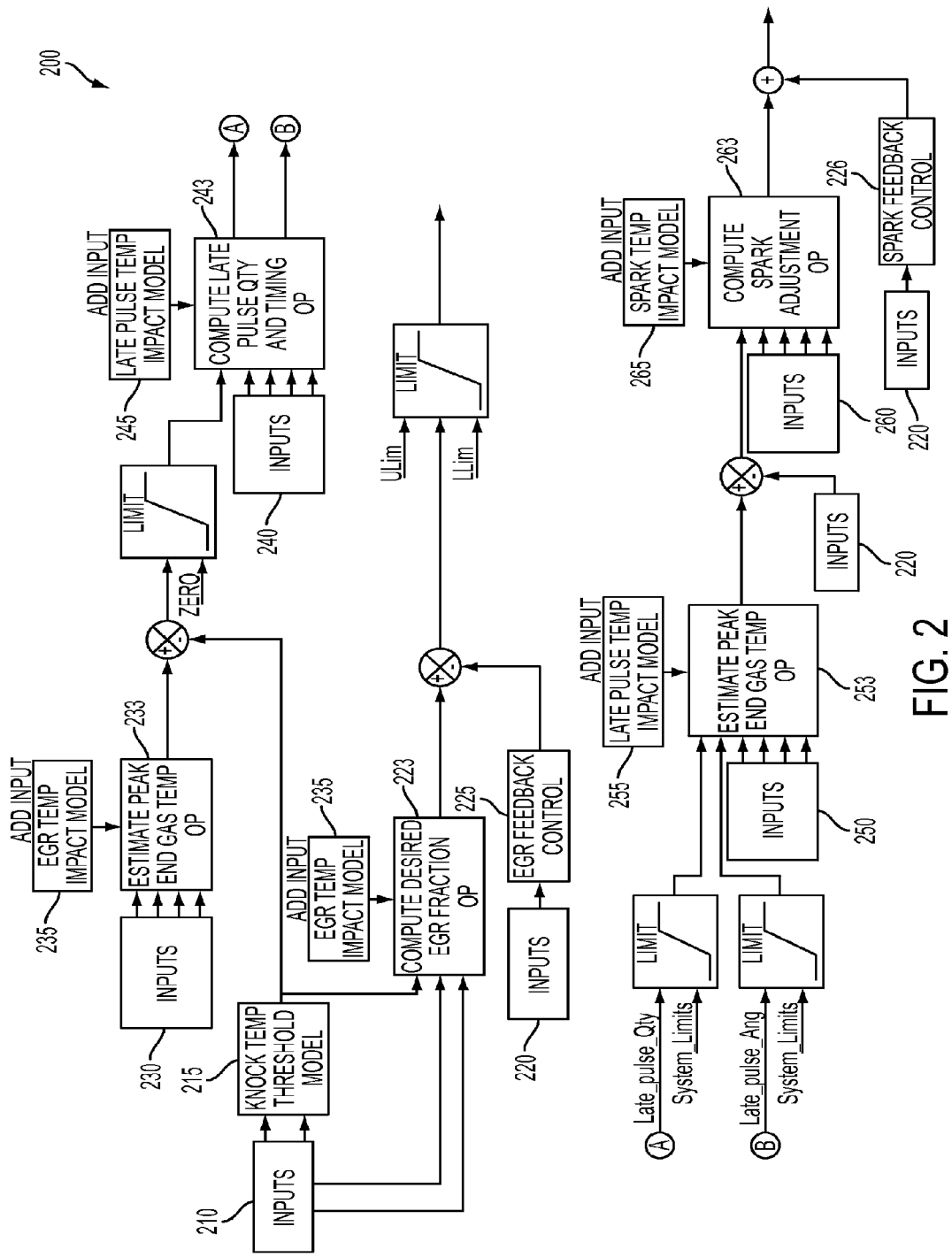
FIG. 2 illustrates an overview of certain inputs, operations and processing involving the steps of the method of the present invention in accordance with one or more embodiments.

FIG. 2 illustrates an overview of certain inputs, operations and processing involving the steps of the method of the present invention in accordance with one or more embodiments. For the avoidance of doubt, is intended to relate the various inputs, modeling inputs, reference operations and associated relationships there between to one of ordinary skill in the art in better understanding the present invention. It will be further appreciated by those of ordinary skill in the art that inputs involving engine characteristics, additional inputs involving modeling and algorithmic determinations, reference operations involving various processing steps associating various inputs in relation to one another, and processed outputs (using such varied inputs, additional inputs and processing operations) are depicted in FIG. 2 for referential purposes that may be further used in other Figures and in better understanding various embodiments of the present invention. For instance, FIG. 3 sets forth the present invention in accordance with one form of the control system of the present invention using the general principles relating input, additional input, referenced operations and processed outputs set forth in FIG. 2. Similarly the steps of the control system for a method of the present invention for a preferred embodiment depicted in FIG. 4 may also be associated with the general principles relating input, additional input, referenced operations and processed outputs set forth in FIG. 2. Further, FIG. 5, which depicts an overall view of a spark ignition type internal combustion engine having a controller means in communication with the spark igniter, fuel injector and an EGR configuration, may also be associated with the general principles relating input, additional input, referenced operations and processed outputs set forth in FIG. 2, and in particular to those involving the communications and processing within the associated controller means. The exemplars of FIG. 2, depicted and illustrated below, are intended to assist with better understanding the present invention in its associated claims, operation and relational associations of input, additional input, referenced operations and processed outputs.

From FIG. 2, inputs to the control system 200 are depicted at 210, 220, 230, 240, 250 and 260. The inputs depicted include various engine operation characteristics including sensor data associated with knock, however the present invention is not so limited. Additional inputs to the control system 200 include varied estimates and results of modeling events which are determined in reference as input to the mathematical or algorithmic models of the determinations made by the control system 200 at various operations within the system.

For instance, additional inputs include a Knock Temperature Threshold Model at 215, an EGR Temperature Impact Model determination at 235, a Late Pulse Temperature impact model at 245, a Late Pulse Temperature impact model post-DI at 255, a Spark Temperature Impact model at 265. Each of these additional inputs provide additional data in combination with the input data to the control system at various operations (which may include forward models of feedforward controls, for instance) to enable an output determination to be made by the referenced operation in the control system. Examples of referenced operations of the control system include Compute Desired EGR Fraction at 223, Estimate Peak End Gas Temperature at 233, Compute Late Pulse Quantity and Timing at 243, Estimate Peak End Gas Temperature post DI at 253, and Compute Spark Adjustment at 263. Each of the referenced operations uses inputs and additional inputs as indicated through its respective mathematical or algorithmic operation to provide an output value, signal or determination associated with its respective operation.

From FIG. 2, feedback controls are also provided as part of the system control 200. For instance feedback controls associated with EGR are provided for at 225 and with Spark are provided for at 226. The present invention may also have additional feedback controls for other implementations and applications not depicted in FIG. 2 as the present invention is not so limited.

Figure 3:
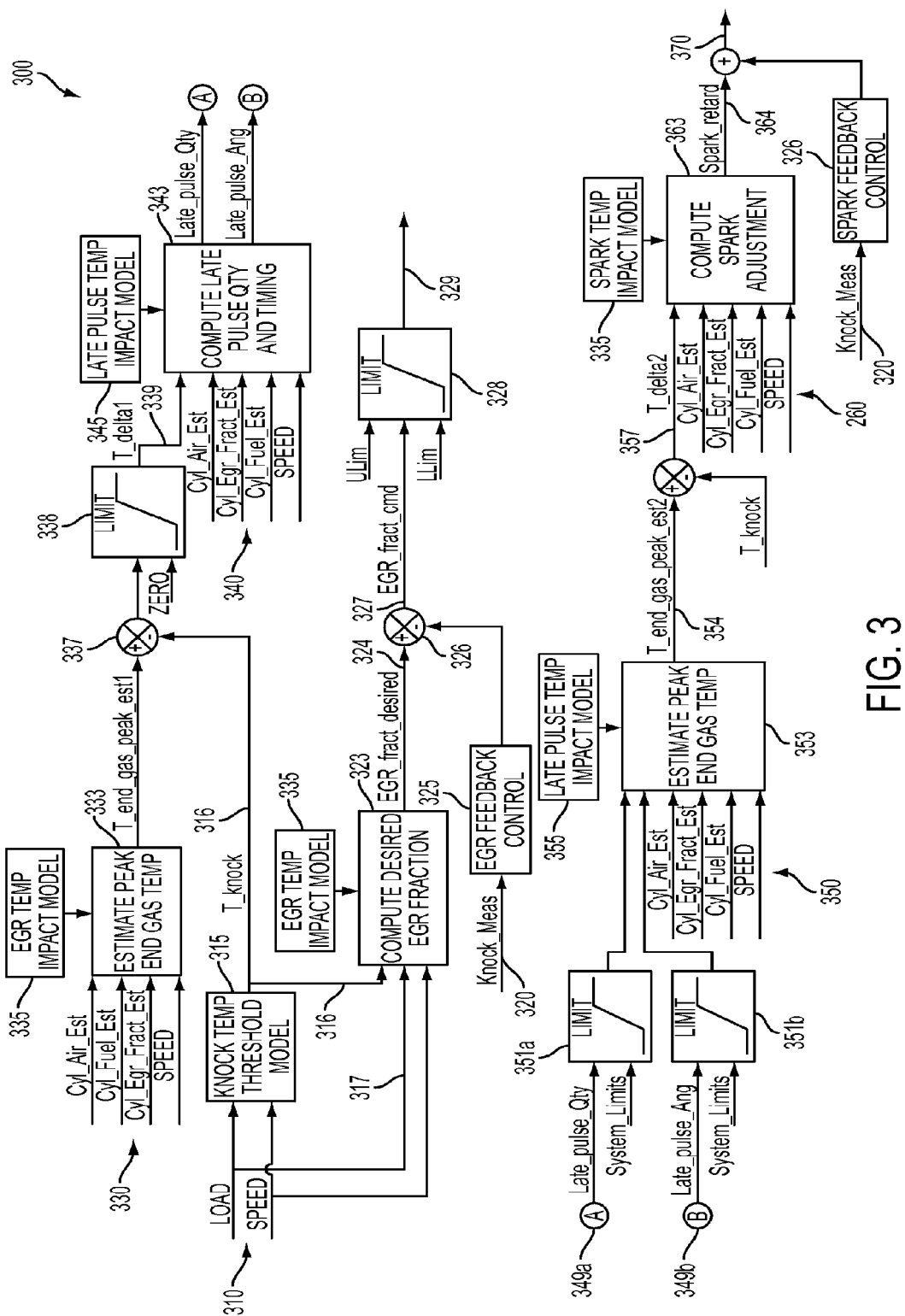
FIG. 3 is an illustration of a block diagram of one form of the control system of the present invention.

FIG. 3 is an illustration of a block diagram of one form of the control system of the present invention. From FIG. 3, the control system of the present invention provides a method for actuation approaches to an engine to reduce knock based upon the inputs, additional inputs, models and estimations and referenced operations of the control system. For instance, a first set of inputs, engine load and engine speed, is provided at 310. Each of these inputs 310 is then provided to a model of Knock Temp Threshold Model at 315 and an operation (or control as used herein) Compute Desired EGR Fraction at 333. Once the inputs 310 are provided to the Knock Model of 315, an output estimate of the threshold temperature for knock (or T_knock) is determined at 316. The determined value of T_knock then becomes an input to varied other operations for comparison with the engine temperature such that determinations as to steps for temperature suppression can be made by the system control 300. T_knock is then used as input to the Compute Desired Fraction model at 333. The Compute Desired Fraction model at 333 is an exemplary operation of a feedforward calculation in which the engine speed and load are provided for as input, recognizing that a determination of an EGR fraction is made in order to maintain the temperature below a predetermined or identified threshold value.

Once the T_knock value is determined at 316 and is used as input along with engine speed and engine load as inputs at 317, the additional input data from the model of EGR Temperature Impact at 335 is also utilized to computer the desired EGR fraction at 323. The output of the EGR fraction computation is the desired EGR fraction (EGR fraction desired) at 324. The desired EGR fraction of 324 is then input to the junction at 326 along with the output of the EGR Feedback control of 325 determined from the measured knock input of 320. Based on the value of the feedback control and the desired EGR value, a signal is generated for the EGR fraction at 327. The EGR fraction signal is then compared with predetermined upper and lower limits at 328, where based on the comparison, a final EGR actuator command is generated as output at 329. The EGR actuator signal of 329 is a command to either perform EGR actuation or not in relation to the limit analysis of 328. For instance, where the EGR fraction command is within the limit thresholds where the utilization of an EGR actuation approach is beneficial to reduce knock, the signal of 329 is instructive to activate the EGR actuator.

In one or more preferred embodiments, the control system of the present invention provides for an EGR actuation approach as a first actuation assessment step. In a preferred embodiment the EGR actuation is an EGR for charge dilution (temperature reduction). Similarly, where the use of EGR actuation is determined by the present invention to be beneficial to the engine, the method of the present invention may provide that the actuation for EGR continues in parallel to the assessment and implementation of one or more additional actuation approaches, or conversely, is used solely or for only a period of time, based on the limits and operating conditions of the engine.

Additionally from FIG. 3, after the determination of T_knock at 316, and concurrent with or separate from the EGR actuation activity determined at 329, the present invention provides for determining the activation of a first, second, further, supplemental or substitutional actuation approach, or its non-activation.

Inputs are provided for at 330 and include in-cylinder air and fuel estimates, EGR fractional estimates and engine speed at 330. Additional input is provided at 335 being from the EGR Temperature Impact model. The reference operation of Estimating Peak End Has Temperature is performed at 333 and as output at 334, an estimate of end gas peak temperature is determined as T_end_gas_peak_est at 336. The end gas peak temperature at 336 is essentially that temperature estimate expected based on the conditions of the in-cylinder conditions presented through the inputs. Similarly, the model of EGR Temperature Impact at 335, as for any model of the control system, may be a physic-based model, the result of test or scenario developments, or algorithmic equations and the like. The output of 333 and the knock temperature threshold of 316 are combined at the summing juncture 337 and assessed in view of the limits of 338. At 338, a comparison is performed to determine whether the estimated end gas temperature of 336 is less than the t_knock value of 316, whereafter, if the it is less than the t_knock value then the limit is not satisfied (i.e., zero) and the EGR actuation approach is not enacted for the engine. However, if it is greater than the t_knock value then it is within limits (greater than zero) and the EGR actuation approach is enacted with respect to the limits. The difference in the above temperatures is determined to be t_delta1 at 339.

Additionally from FIG. 3, after the determination of t_delta1 at 339, and concurrent with or separate from the EGR actuation activity determined at 338, the present invention provides for evaluating the activation of a first, second, further, supplemental or substitutional actuation approach, or its non-activation, including that of direct injection (DI).

Preferably, before activating a DI actuation activity, in one or more preferred embodiments, the earlier approaches employed by the system control of the present invention provided for lowering the temperature of the cylinder such that a next implementation of a DI approach would have greater effect and benefit to an engine under the present invention.

Inputs are provided for at 340 and include in-cylinder air and fuel estimates, EGR fractional estimates and engine speed at 3430. Additional input is provided at 345 being from the Late Pulse temperature Impact model. The reference operation of Compute Late Pulse Quantity and Timing is performed at 343 and as output at 344a and 334b, an estimate of a late pulse quantity and an estimate of a late pulse angle is determined. The estimates determined at 344a and 344b are then used as input with the system limits at 347a and 347b to determine how the injection would affect the temperature and hence the knock reduction. Where the estimates are within the limits, the actuation of DI in a late injection or second injection is undertaken by the present invention at 351a and/or 351b. In preferred embodiment the present invention provides additional feedback control to the DI steps where additional injections may be undertaken where the estimated quantities are determined to remain within system limits on subsequent passes of this portion of the referenced operation. In other embodiments, following a DI event, the present invention provides for further consideration and evaluation of additional actuation approaches. In further preferred embodiments the DI is a late pulse fuel injection for evaporative cooling actuation.

Additionally from FIG. 3, after the determination of DI actuation at 351a and 351b, and concurrent with or separate from the DI actuation activity, the present invention provides for evaluating the activation of a first, second, third, further, supplemental or substitutional actuation approach, or its non-activation, including that of spark retarding (SR).

Inputs are provided for at 350 and include in-cylinder air and fuel estimates, EGR fractional estimates and engine speed at 350. Inputs of 350 also include the outputs of DI limit assessment at 351a and 351b. Additional input is provided at 355 being from the Late Pulse temperature Impact model (post-DI). The reference operation of Estimate Peak End Gas Temp (post DI) is performed at 353. Output from the operation includes determining an end gas peak temperature estimate at 354. The end gas peak temperature estimate of 354 and the t_knock determined earlier at 316 are combined in a summing junction at 356. Output from the summing junction includes a temperature difference determination of T-delta2 at 357. The t_delta2 of 357 and the inputs of 360 are inputted with the additional input of Spark Temp impact Model at 365. These collectively are input to the referenced operation Compute Spark Adjustment at 363, where a spark retard command is output as a signal at 364.

The spark retard signal of 364 is a command to activate retarding of the spar in the even the t_delta2 determination of 357 is high. If the t_delta2 value is low, then there is no positive command to activate a spark retard actuation activity. The spark retard signal of 364 is combined with the output of the spark feedback control feedback of 326 from measured knock values at 320, and a signal is provided to activate or not activate further spark retarding at 370. In a preferred embodiment, the SR is a SR for reduced peak cylinder temperatures approach.

Additionally a feedback control from the sensed knock of 320 is also provided for in which final adjustments to reduce the knock through spark retard actuation can be performed to virtually eliminate any knock of the engine as a final step. The sensed knock of 320 is provided as input to the spark control feedback operation of 326 and the output is combined with the spar retard output of 364 at 370, and additional signals are provided via feedback to ensure that continued spark retarding enables a reduction in knock based upon the present knock sensed in the system.

The present invention, in one or more operative embodiments, is intended to cease actuations once a reduction in knock using one or more of the approaches of the systems control where feedback provided from within the control method provides information to the system control to continue, cease or otherwise activate one or more actuation approaches to retard knock for an engine.

Figure 4:
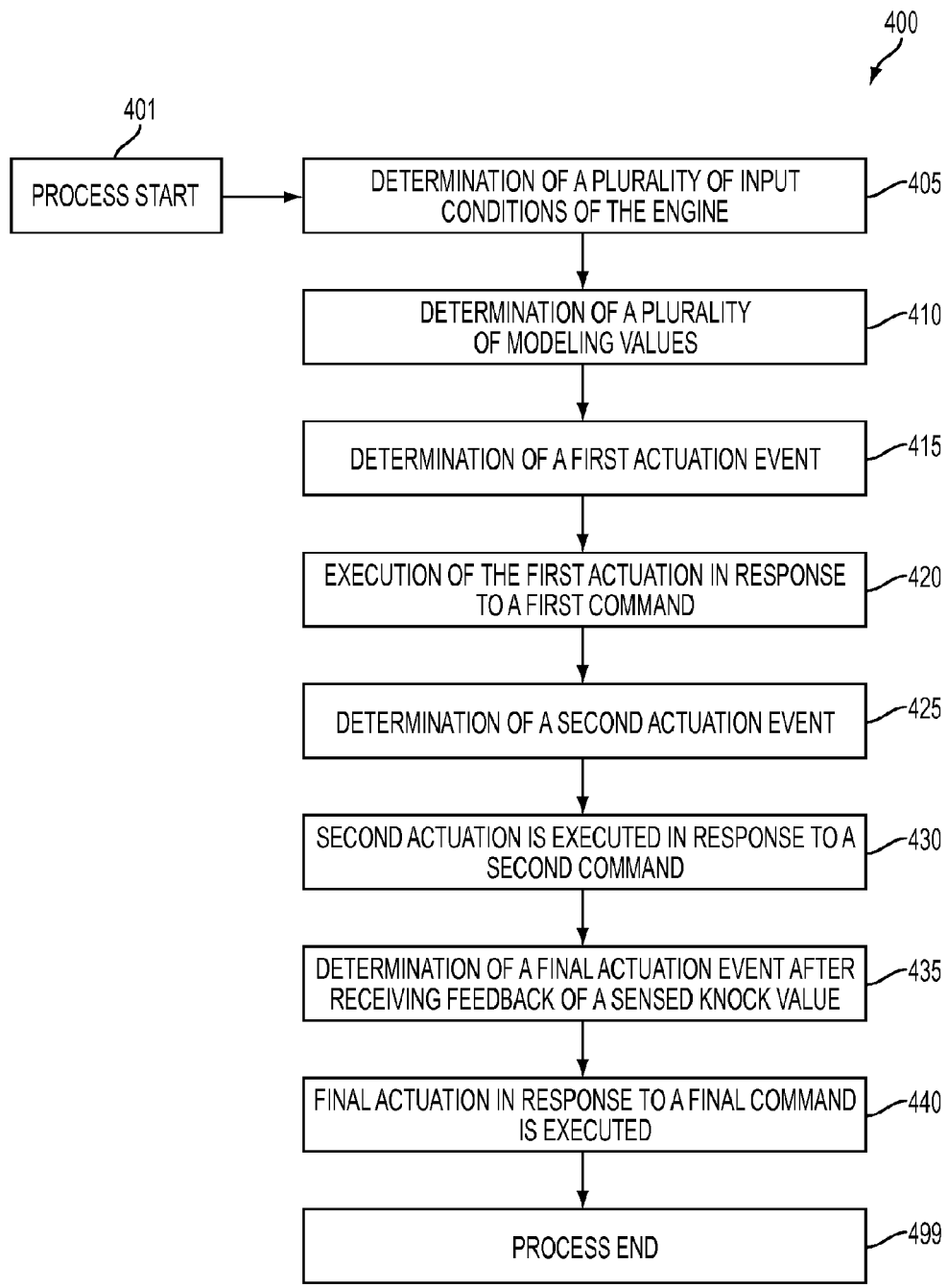
FIG. 4 illustrates the steps of the control system for a method of the present invention for a preferred embodiment.

FIG. 4 illustrates the steps of the control system for a method 400 of the present invention for a preferred embodiment.

From FIG. 4, the approach for the method for reducing in-cylinder temperature in a spark-ignited engine using a plurality of actuation events in relation to estimated peak cylinder temperature and sensed knock is provided. At step 401 is the process initiation. At 405, a determination of a plurality of input conditions of the engine including in-cylinder air, fuel and EGR fractions is performed. At 410, a determination of a plurality of modeling values associated with additional inputs in relation to the operation of the engine in a preferred state (i.e., reduced knocking, better performance, etc.) is performed. Also at 410 is where the calculation of outputs of the models needed for the performance of the method of the present invention is set forth.

For instance at 410, a knock threshold temperature and a peak end gas temperature estimate are determined. At 415, a determination of a first actuation event is made by comparing a desired EGR fraction value with predetermined fraction system limits. In this manner the EGR event is preferably a first actuation event. At 420, the execution of the first actuation in response to a first command is performed. At 420, in the event it is determined that the event cannot be performed or should not be performed in view of system values and engine performance, for instance, the command is preferably a not to perform command. At 425, a determination of a second actuation event is undertaken by comparing one or more peak end gas temperature estimates with predetermined end gas temperature system limits. At 430, the second actuation is executed in response to a second command. At 435, a determination of a final actuation event after receiving feedback of a sensed knock value from a sensor determining sensed knock is performed. At 440, the final actuation in response to a final command is executed and in a preferred embodiment, such final actuation is a spark retarding event. After the final event, the process ends operation at 499.

Figure 5:
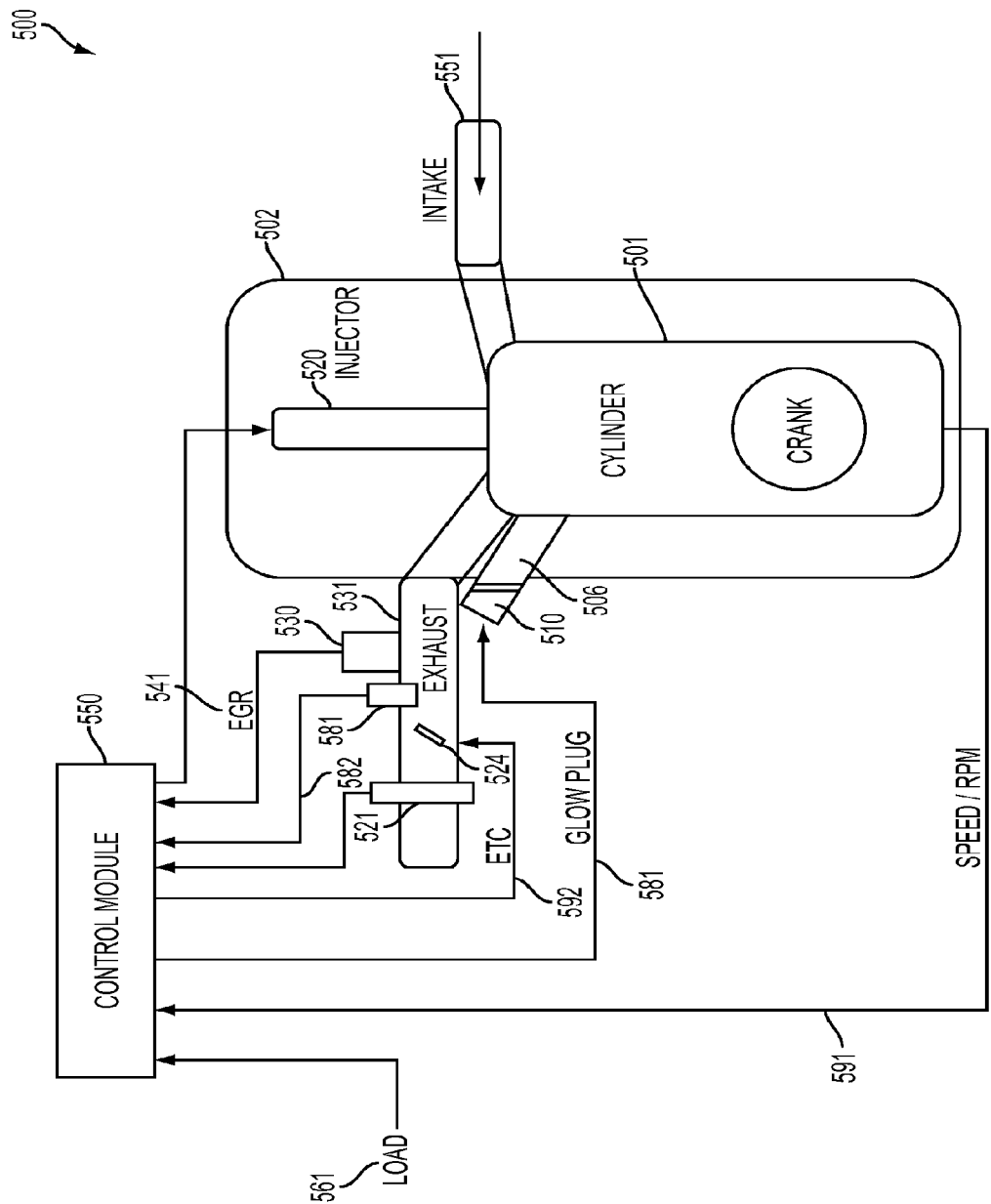
FIG. 5 depicts an overall view of a spark ignition type internal combustion engine having a controller means in communication with the spark igniter, fuel injector and an EGR configuration.

FIG. 5 depicts an overall view of a spark ignition type internal combustion engine 500 having a controller means 550 in communication with the spark igniter 510, fuel injector 520 and an EGR configuration 530. From FIG. 5, 501 indicates a crank case with cylinder and piston, 502 a cylinder block, wherein is also located at the upper portion a combustion chamber. Also in FIG. 5 is included at 506 a spark plug arranged at the center of a top surface of the combustion chamber 507 in communication through an igniter via 581 with the controller 550. Further an air intake port is located at 551, an exhaust port at 531 and a knock sensor at 581 in communication with the controller at 582.

At the upper portion of the block 502 is also included, but not diagrammed, intake ports connected through intake branch pipes which have fuel injectors arranged in them for injecting fuel toward corresponding intake ports. An exemplary depiction of a fuel injector is set forth at 520 though the present invention may also use a high pressure rail configuration and is not otherwise so limited. Further, the fuel injectors may also be arranged inside the combustion chambers instead of being attached to the intake branch pipes under the present invention.

An exhaust port 531 is connected through an exhaust manifold where inside the exhaust manifold is typically an air-fuel ratio sensor 521 in communication with the controller 550. The exhaust manifold and the intake branch pipes are connected with each other through EGR passage (not shown) connected via an EGR valve 530 for an exhaust gas recirculation (referred to as "EGR gas") in communication with the controller 550 via 541. An exhaust gas gate is also provided at 524.

Typically inside the EGR is included an EGR control valve 530 is arranged, where around the EGR passage is an EGR cooling device for cooling the EGR gas flowing through the inside of the EGR passage. As used herein, the EGR passage, EGR control valve, and EGR cooling device are referred to together as the "EGR mechanism". Load on the engine is determined from inputs of 561 and such is in communication with the controller 550.

An example of an EGR configuration suitable for use with the present invention is that discussed in U.S. Patent Application 20100147272 entitled "Exhaust Gas Recirculation Cooler Coolant Plumbing Configuration" the teachings if which are incorporated herein by reference. In U.S. Patent Application 20100147272, the cooling system may comprise a heat exchanger, a pump coupled to the heat exchanger, an EGR cooler coupled to the pump, and a first valve coupled to the EGR cooler and the heat exchanger. The configuration utilizes a valve to maximize the rate a coolant flows throughout the system when the valve is in an open position and also to warm up an engine when the valve is in a closed position.

Inputs derived from operation of the engine determine speed of the engine and are in communication with the controller 550 at 591. Similarly, exhaust gas temperature can be monitored by sensor and communicated via 592 to the controller 550 as can be crank angle (crank angle sensor not shown) also in communication with the controller 550.

The controller 550 is preferably an electronic control unit comprised of a digital computer, which may include a programmable computer product of the present invention for instance, and include components connected with and in communication with one another through a back bone circuit or other bidirectional bus such as a ROM (read only memory), RAM (random access memory), CPU (microprocessor), input port, and output port, by example. The present invention may also be a circuit, application, software or other electronic means within a controller as 550 or separate and in communication with the controller 550 as well.

In operation an output signal 582 of the sensed knock from the knock sensor 581 is input through a corresponding analog-to-digital converter (A/D) typically. The sensed knock, in a particular step of one embodiment of the present invention, when received at the controller including the method of the present invention such as input 320 for feedback 326 of FIG. 3 as one instance, is used with the spark retard data of 364 to determine additional spark retarding actuation events at 370 which then issue signal command outputs from controller 550 to communicate spark retarding events associated with the igniter 510, via communication link 581, to control spark retard and reduce knock of the engine.

Similarly, in association with step 435 of FIG. 4 for example, output signal of the sensed knock from the knock sensor is input through a corresponding analog-to-digital converter (A/D) and is used with a referenced operation to compute spark adjustment and determine additional spark retarding actuation events. Once determined, the controller, as output may issue a signal to the igniter which communicates spark retarding command(s) associated with the actuation event to the igniter, via a communication link.

It will be appreciated by those skilled in the art that there are many variations to the steps above that may be undertaken or altered while remaining within the scope of the present invention.

As used herein, various engines may be used with the present invention and preferably those that are spark-ignited, have fuel injection, and are capable of EGR. However, the invention is not so limited whereas it is contemplated by the present invention that additional or alternate actuation approaches may be within the present scope and can be operated with or implemented upon engines that are configured to support such associated actuation. It is further envisioned that engines ideally benefitting from various embodiments hereinunder will have controllers on subsystems and components which will be in operable communication with one another to support commands involving actuation that may be results of operation of the present invention.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

What is claimed is:

1. A method, comprising:
   receiving a plurality of input conditions regarding an engine;
   determining an estimate temperature threshold for knock and one or more peak end gas temperature estimates based on the plurality of input conditions;
   selectively executing at least one of a first actuation event, a second actuation event, and a third actuation event;
   wherein the first actuation event is not executed when the one or more peak end gas temperature estimates is less than the estimated temperature threshold for knock, and wherein the first actuation event is executed when the one or more peak end gas temperature estimates is greater than or equal to the estimated temperature threshold for knock.

2. The method of claim 1, wherein the first actuation event is an exhaust gas recirculation (EGR) event for diluting a charge of the engine.

3. The method of claim 1, further comprising:
   comparing the one or more peak end gas temperature estimates with predetermined end gas temperature system limits; and
   selectively executing the second actuation event responsive to the one or more peak end gas temperature estimates being within the predetermined end gas temperature system limits.

4. The method of claim 3, wherein the second actuation event includes a direct injection event.

5. The method of claim 1, further comprising:
   comparing the one or more peak end gas temperature estimates to the estimate temperature threshold for knock; and
   selectively executing the third actuation event responsive to the comparison between the one or more peak end gas temperature estimates and the estimate temperature threshold for knock.

6. The method of claim 5, further comprising:
   determining a spark adjustment based on the plurality of input conditions and the comparison between the one or more peak end gas temperature estimates to the estimate temperature threshold for knock;
   receiving a value indicative of knock;
   comparing the value indicative of knock to the determined spark adjustment; and
   adjusting the third actuation event responsive to the comparison between the value indicative of knock and the determined spark adjustment.

7. The method of claim 6, wherein the third actuation event is a spark retarding event.

8. The method of claim 1, wherein the plurality of inputs include an engine load and an engine speed.

9. The method of claim 1, wherein the first actuation event is executed first, the second actuation event is executed second, and the third actuation event is executed third.

10. An apparatus, comprising:
    a feedforward control module structured to receive a first plurality of inputs regarding operation of an engine, wherein the feedforward control module is structured to determine an estimate temperature threshold for knock and one or more peak end gas temperature estimates responsive to the first plurality of inputs; and
    a control module including the feedforward control module, wherein the control module is structured to selectively execute at least one of a first actuation event, a second actuation event, and a third actuation event;
    wherein the control module is structured to not execute the first actuation event when the one or more peak end gas temperature estimates is less than the estimated temperature threshold for knock, and wherein control module is structured to execute the first actuation event when the one or more peak end gas temperature estimates is greater than or equal to the estimated temperature threshold for knock.

11. The apparatus of claim 10, wherein the first plurality of inputs include a value indicative of a speed of the engine, a value indicative of a load on the engine, an in-cylinder air estimate, an in-cylinder fuel estimate, and an in-cylinder exhaust gas recirculation (EGR) fraction estimate.

12. The apparatus of claim 11,
    wherein the feedforward control module is structured to determine the estimate temperature threshold for knock based on the value indicative of the speed of the engine and the value indicative of the load on the engine;
    wherein the feedforward control module is structured to determine the one or more peak end gas temperature estimates based on the value indicative of the speed of the engine, the in-cylinder air estimate, the in-cylinder fuel estimate, and the in-cylinder exhaust gas recirculation (EGR) fraction estimate.

13. The apparatus of claim 10,
    wherein the control module is structured to generate a difference value indicative of a difference between the estimate temperature threshold for knock and the one or more peak end gas temperatures;
    wherein the control module is structured to determine a late pulse quantity and a late pulse angle for a fuel injector for the engine responsive to the difference value, a second plurality of inputs, and a late pulse temperature impact model.

14. The apparatus of claim 13,
    wherein the control module is structured to compare the determined late pulse quantity and late pulse angle to a system limit; and
    wherein the control module is structured to execute the second actuation event responsive to the comparison being within the system limit.

15. The apparatus of claim 14,
    wherein the second actuation event is a direct injection event; and
    wherein the second plurality of inputs include a value indicative of a speed of the engine, an in-cylinder air estimate, an in-cylinder fuel estimate, and an in-cylinder exhaust gas recirculation (EGR) fraction estimate.

16. The apparatus of claim 10, further comprising:
    a feedback control module structured to receive a value indicative of engine knock; and wherein the feedforward control module is structured to determine a desired EGR fraction based on a value indicative of a speed of the engine, a value indicative of a load on the engine, and the estimate temperature threshold for knock.

17. The apparatus of claim 16,
wherein the control module is structured to compare the desired EGR fraction to the value indicative of engine knock;
wherein the control module is structured to execute the first actuation event responsive to the comparison being within predetermined upper and lower EGR fraction limits; and
wherein the control module is structured to not execute the first actuation event responsive to the comparison being outside the predetermined upper and lower EGR fraction limits.

18. The apparatus of claim 16,
wherein the third actuation event is a spark retarding event;
wherein the first actuation event is executed first, the second actuation event is executed second, and the third actuation event is executed third;
wherein the feedforward control module is structured to determine a spark adjustment to the spark retarding event based on a third plurality of input conditions;
wherein the control module is structured to compare the value indicative of engine knock to the determined spark adjustment and to further modify the spark retarding event relative to the determined spark adjustment responsive to the comparison between the value indicative of knock and the determined spark adjustment.

19. A system, comprising:
an exhaust gas recirculation (EGR) system; and
a controller communicably coupled to the EGR system, the controller structured to:
  receive a plurality of input conditions regarding an engine;
  determine an estimate temperature threshold for knock and one or more peak end gas temperature estimates based on the plurality of input conditions; and
  selectively execute at least one of a first actuation event, a second actuation event, and a third actuation event based at least in part on the determined estimate temperature threshold for knock and the one or more peak end gas temperature estimates;
  wherein the first actuation event is not executed when the one or more peak end gas temperature estimates is less than the estimated temperature threshold for knock, and wherein the first actuation event is executed when the one or more peak end gas temperature estimates is greater than or equal to the estimated temperature threshold for knock.

20. The system of claim 19,
wherein the first actuation event is an EGR event, the second actuation event is a direct injection event, and the third actuation event is a spark retarding event; and
wherein the first actuation event is executed first, the second actuation event is executed second, and the third actuation event is executed third.

* * * * *